United States Patent [19]

Cornaby

[11] Patent Number: 5,410,722
[45] Date of Patent: Apr. 25, 1995

[54] QUEUE SYSTEM FOR DYNAMICALLY ALLOCATING AND MOVING MEMORY REGISTERS BETWEEN A PLURALITY OF PSEUDO QUEUES

[75] Inventor: Stephen R. Cornaby, Niwot, Colo.

[73] Assignee: Conner Peripherals, Inc., San Jose, Calif.

[21] Appl. No.: 7,199

[22] Filed: Jan. 21, 1993

[51] Int. Cl.$^6$ .................. G06F 7/16; G06F 12/06; G06F 12/08; G06F 12/02
[52] U.S. Cl. ................. 395/800; 364/229.3; 364/229.5; 364/238.4; 364/238.6; 364/239.4; 364/242.91; 364/244.3; 364/245; 364/245.2; 364/246; 364/247.7; 364/246.92; 364/254.3; 364/254.5; 364/254.7; 364/DIG. 1; 364/DIG. 2
[58] Field of Search ............ 395/800, 600, 650, 400, 395/425, 250, 325, 275, 725, 575, 775, 375; 364/DIG. 1, DIG. 2; 371/36

[56] References Cited

U.S. PATENT DOCUMENTS

| | | | |
|---|---|---|---|
| 4,646,231 | 2/1987 | Green et al. | 395/650 |
| 5,010,482 | 4/1991 | Keller et al. | 395/275 |
| 5,093,912 | 3/1992 | Dong et al. | 395/650 |
| 5,129,084 | 7/1992 | Kelly, Jr. et al. | 395/650 |
| 5,175,857 | 12/1992 | Inoue | 395/800 |
| 5,263,160 | 11/1993 | Porter et al. | 395/650 |

*Primary Examiner*—Alyssa H. Bowler
*Assistant Examiner*—Daniel H. Pan
*Attorney, Agent, or Firm*—Fliesler, Dubb, Meyer & Lovejoy

[57] ABSTRACT

A plurality of queues where each queue is defined by a set of criteria, the queue system comprises a plurality of header registers where each header register defines a queue in the queue system and a plurality of task registers where each task register can be associated with each queue in the queue system. Each header register has a unique address and contains a previous field and a next field. Each task register has a unique address and contains a previous field and a next field. Each previous field and said next field stores the address of another register in a given queue such that each queue is formed in a double link structure. Control means is provided for dynamically assigning task registers to queues by controlling the addresses stored in the previous and next fields in each header and task registers such that each of said task registers is always assigned to a queue in the queue system.

7 Claims, 10 Drawing Sheets

| HEADER REGISTERS | | |
|---|---|---|
| ADD | PF | NF |
| A | 4 | 2 |
| B | 1 | 1 |
| C | 3 | 3 |
| D | 9 | 5 |

| TASK REGISTERS | | | | |
|---|---|---|---|---|
| ADD | PF | NF | TN | Q |
| 1 | B | B | A1 | B |
| 2 | A | 4 | A2 | A |
| 3 | C | C | A3 | C |
| 4 | 2 | A | A4 | A |
| 5 | D | 6 | | D |
| 6 | 5 | 7 | | D |
| 7 | 6 | 8 | | D |
| 8 | 7 | 9 | | D |
| 9 | 8 | D | | D |

FIGURE 3A

| HEADER REGISTERS | | |
|---|---|---|
| ADD | PF | NF |
| A | A | A |
| B | B | B |
| C | C | C |
| D | 9 | 1 |

| TASK REGISTERS | | | | |
|---|---|---|---|---|
| ADD | PF | NF | TN | Q |
| 1 | D | 2 | | D |
| 2 | 1 | 3 | | D |
| 3 | 2 | 4 | | D |
| 4 | 3 | 5 | | D |
| 5 | 4 | 6 | | D |
| 6 | 5 | 7 | | D |
| 7 | 6 | 8 | | D |
| 8 | 7 | 9 | | D |
| 9 | 8 | D | | D |

FIGURE 3B

| HEADER REGISTER | | |
|---|---|---|
| ADD | PF | NF |
| A | 1 | 1 |
| B | B | B |
| C | C | C |
| D | 9 | 2 |

| TASK REGISTERS | | | | |
|---|---|---|---|---|
| ADD | PF | NF | TN | Q |
| 1 | A | A | A1 | A |
| 2 | D | 3 | | D |
| 3 | 2 | 4 | | D |
| 4 | 3 | 5 | | D |
| 5 | 4 | 6 | | D |
| 6 | 5 | 7 | | D |
| 7 | 6 | 8 | | D |
| 8 | 7 | 9 | | D |
| 9 | 8 | D | | D |

FIGURE 3C

HEADER REGISTERS

| ADD | PF | NF |
|-----|----|----|
| A | 2 | 1 |
| B | B | B |
| C | C | C |
| D | 9 | 3 |

TASK REGISTERS

| ADD | PF | NF | TN | Q |
|-----|----|----|----|----|
| 1 | A | 2 | A1 | A |
| 2 | 1 | A | A2 | A |
| 3 | D | 4 |  | D |
| 4 | 3 | 5 |  | D |
| 5 | 4 | 6 |  | D |
| 6 | 5 | 7 |  | D |
| 7 | 6 | 8 |  | D |
| 8 | 7 | 9 |  | D |
| 9 | 8 | D |  | D |

FIGURE 3D

HEADER REGISTER

| ADD | PF | NF |
|-----|----|----|
| A | 3 | 1 |
| B | B | B |
| C | C | C |
| D | 9 | 4 |

TASK REGISTERS

| ADD | PF | NF | TN | Q |
|-----|----|----|----|----|
| 1 | A | 2 | A1 | A |
| 2 | 1 | 3 | A2 | A |
| 3 | 2 | A | A3 | A |
| 4 | D | 5 |  | D |
| 5 | 4 | 6 |  | D |
| 6 | 5 | 7 |  | D |
| 7 | 6 | 8 |  | D |
| 8 | 7 | 9 |  | D |
| 9 | 8 | D |  | D |

FIGURE 3E

HEADER REGISTERS

| ADD | PF | NF |
|-----|----|----|
| A   | 3  | 2  |
| B   | 1  | 1  |
| C   | C  | C  |
| D   | 9  | 4  |

TASK REGISTERS

| ADD | PF | NF | TN | Q |
|-----|----|----|----|---|
| 1   | B  | B  | A1 | B |
| 2   | A  | 3  | A2 | A |
| 3   | 2  | A  | A3 | A |
| 4   | D  | 5  |    | D |
| 5   | 4  | 6  |    | D |
| 6   | 5  | 7  |    | D |
| 7   | 6  | 8  |    | D |
| 8   | 7  | 9  |    | D |
| 9   | 8  | D  |    | D |

FIGURE 3F

HEADER REGISTER

| ADD | PF | NF |
|-----|----|----|
| A   | 4  | 2  |
| B   | 1  | 1  |
| C   | C  | C  |
| D   | 9  | 5  |

TASK REGISTERS

| ADD | PF | NF | TN | Q |
|-----|----|----|----|---|
| 1   | B  | B  | A1 | B |
| 2   | A  | 3  | A2 | A |
| 3   | 2  | 4  | A3 | A |
| 4   | 3  | A  | A4 | A |
| 5   | D  | 6  |    | D |
| 6   | 5  | 7  |    | D |
| 7   | 6  | 8  |    | D |
| 8   | 7  | 9  |    | D |
| 9   | 8  | D  |    | D |

FIGURE 3G

| HEADER REGISTERS | | |
|---|---|---|
| ADD | PF | NF |
| A | 4 | 2 |
| B | 1 | 1 |
| C | 3 | 3 |
| D | 9 | 5 |

| TASK REGISTERS | | | | |
|---|---|---|---|---|
| ADD | PF | NF | TN | Q |
| 1 | B | B | A1 | B |
| 2 | A | 4 | A2 | A |
| 3 | C | C | A3 | C |
| 4 | 2 | A | A4 | A |
| 5 | D | 6 | | D |
| 6 | 5 | 7 | | D |
| 7 | 6 | 8 | | D |
| 8 | 7 | 9 | | D |
| 9 | 8 | D | | D |

FIGURE 3H

| HEADER REGISTER | | |
|---|---|---|
| ADD | PF | NF |
| A | 7 | 2 |
| B | 1 | 1 |
| C | 3 | 3 |
| D | 9 | 8 |

| TASK REGISTERS | | | | |
|---|---|---|---|---|
| ADD | PF | NF | TN | Q |
| 1 | B | B | A1 | B |
| 2 | A | 4 | A2 | A |
| 3 | C | C | A3 | C |
| 4 | 2 | 5 | A4 | A |
| 5 | 4 | 6 | A5 | A |
| 6 | 5 | 7 | A6 | A |
| 7 | 6 | A | A7 | A |
| 8 | D | 9 | | D |
| 9 | 8 | D | | D |

FIGURE 3I

| HEADER REGISTERS | | |
|---|---|---|
| ADD | PF | NF |
| A | 7 | 2 |
| B | 1 | 1 |
| C | 5 | 3 |
| D | 9 | 8 |

| TASK REGISTERS | | | | |
|---|---|---|---|---|
| ADD | PF | NF | TN | Q |
| 1 | B | B | A1 | B |
| 2 | A | 4 | A2 | A |
| 3 | C | 5 | A3 | C |
| 4 | 2 | 6 | A4 | A |
| 5 | 3 | C | A5 | C |
| 6 | 4 | 7 | A6 | A |
| 7 | 6 | A | A7 | A |
| 8 | D | 9 |   | D |
| 9 | 8 | D |   | D |

FIGURE 3J

| HEADER REGISTER | | |
|---|---|---|
| ADD | PF | NF |
| A | 7 | 4 |
| B | 1 | 1 |
| C | 2 | 3 |
| D | 9 | 8 |

| TASK REGISTERS | | | | |
|---|---|---|---|---|
| ADD | PF | NF | TN | Q |
| 1 | B | B | A1 | B |
| 2 | 5 | C | A2 | C |
| 3 | C | 5 | A3 | C |
| 4 | A | 6 | A4 | A |
| 5 | 3 | 2 | A5 | C |
| 6 | 4 | 7 | A6 | A |
| 7 | 6 | A | A7 | A |
| 8 | D | 9 |   | D |
| 9 | 8 | D |   | D |

FIGURE 3K

| HEADER REGISTERS | | |
|---|---|---|
| ADD | PF | NF |
| A | 7 | 4 |
| B | B | B |
| C | 2 | 3 |
| D | 9 | 1 |

| TASK REGISTERS | | | | |
|---|---|---|---|---|
| ADD | PF | NF | TN | Q |
| 1 | D | 8 |  | D |
| 2 | 5 | C | A2 | C |
| 3 | C | 5 | A3 | C |
| 4 | A | 6 | A4 | A |
| 5 | 3 | 2 | A5 | C |
| 6 | 4 | 7 | A6 | A |
| 7 | 6 | A | A7 | A |
| 8 | 1 | 9 |  | D |
| 9 | 8 | D |  | D |

FIGURE 3L

| HEADER REGISTER | | |
|---|---|---|
| ADD | PF | NF |
| A | 7 | 1 |
| B | B | B |
| C | 2 | 3 |
| D | 9 | 8 |

| TASK REGISTERS | | | | |
|---|---|---|---|---|
| ADD | PF | NF | TN | Q |
| 1 | A | 4 | A8 | A |
| 2 | 5 | C | A2 | C |
| 3 | C | 5 | A3 | C |
| 4 | 1 | 6 | A4 | A |
| 5 | 3 | 2 | A5 | C |
| 6 | 4 | 7 | A6 | A |
| 7 | 6 | A | A7 | A |
| 8 | D | 9 |  | D |
| 9 | 8 | D |  | D |

ROUTINE A

STEP 1 | MAKE THE NEXT FIELD OF THE PREVIOUS REGISTER INDICATED IN THE PREVIOUS FIELD OF THE CURRENT REGISTER EQUAL TO THE NEXT FIELD OF THE CURRENT REGISTER

STEP 2 | MAKE THE PREVIOUS FIELD OF THE NEXT REGISTER INDICATED IN THE NEXT FIELD OF THE CURRENT REGISTER EQUAL TO THE PREVIOUS FIELD OF THE CURRENT REGISTER

FIGURE 4

QUEUE SYSTEM FOR DYNAMICALLY ALLOCATING AND MOVING MEMORY REGISTERS BETWEEN A PLURALITY OF PSEUDO QUEUES

A portion of the disclosure of this patent document contains material which is subject to copyright protection. The copyright owner has no objection to the facsimile reproduction by any one of the patent documents or the patent disclosure as it appears in the United States Patent & Trademark Office patent file or records, but otherwise reserves all copyright rights whatsoever.

CROSS-REFERENCE TO RELATED APPLICATIONS

The following copending U.S. patent application is assigned to the assignee of the present application, is related to the present application and its disclosures is incorporated herein by reference:

Ser. No. 08/006,457 filed Jan. 21, 1993, now U.S. Pat. No. 5,355,486, by Stephen R. Cornaby and entitled SYSTEM FOR ALLOCATING TASKS BETWEEN TWO ACTUATORS SERVICING THE SAME MAGNETIC DISK MEDIA IN A SINGLE DISK DRIVE.

BACKGROUND OF THE INVENTION

1. Field of the Invention.

The invention relates to a system for establishing queues within a processing system and for the effective movement of data between the established queues.

2. Description of the Related Art

Many computer systems employ queues for managing the transferring of tasks and data within the computing system. Queues can be of many types, such as the first in first out queue (FIFO) where the entries stored in the queue are read from the queue in the sequence that the entries were stored in the queue. Another type of queue is the last in first out queue (LIFO) where the last entry stored in the queue is the first entry read out of the queue. This is to say the newest data stored in the queue will be the first data read out of the queue.

Queues have been constructed from hardware registers and from dedicated portions of a memory, acting as a software register, where the queue is operated under the control of a program in the processor. A queue formed from a memory is described in the text *Microprocessor Application Handbook*, Editor-In-Chief David F. Stout, McGraw-Hill Book Company, 1982. The author discusses in Section 17.6, entitled "A Task-Scheduling Executive", the formation of a task queue using a forward linked structure. The forward link structure is formed by having each queue's entry contain a pointer to the address of the next queue entry. A queue formed by the forward link process will define the number and sequence of the registers in the queue at any given instant of time. Further, in many processing systems it is desired to move tasks that are defined as entries within the queue from one queue to another queue where each queue is used to specify a course of action to be taken with regard to the entries in that queue. Normally a task is removed from a queue and physically transferred into another queue. The movement of tasks between queues can be a time consuming process and subjects the task to errors generated during the transfer of the task, thereby requiring error recovery procedures to be invoked or attempt a retry transfer operation.

SUMMARY OF THE INVENTION

It is an object of the invention to provide a queue system for generating a plurality of queues where each queue can include any task registers in the system.

Another object of the invention is that the queues within the queue system are not limited to a fixed length.

It is another object of the invention to have a queue system which allows the queues within the system to be of various types of queues.

It is another object of the invention to structure the queues in the queue system using a double-linked pointer structure where each register contains a pointer to the previous and next register in the queue in which the register resides at that instance in time.

Briefly, this invention is directed to the formation of a plurality of queues from a dedicated set of memory registers within a random access memory unit. The memory registers are either header registers or task registers. Each queue has a specified header register and those task registers assigned to that queue. A task register is always assigned to a queue within the queue system. All registers contains at least two fields, a previous field and a next field. For any register used within the queue system, the previous field will contain the address of the preceding register in that queue and the next field containing the address of the following register in the queue. One queue is designated as an empty queue which will contain those task registers which are not presently being used in one of the active queues in the queue system. Task registers are effectively moved between queues by changing the contents of the next and previous fields of the register to be moved and the next and previous fields of the other registers in the queue which will be affected by the insertion or removal of the task register to be inserted or removed from the queue. The task registers are not physically moved between queues but are effectively moved by controlling the previous and next fields of the register, thereby allowing the formation of pseudo queues within the queue system where the length of each pseudo queue is defined by the number of task registers linked to the header register for that queue at any given instant of time. A control means is provided for performing procedures for inserting and removing task register from queues.

Finally, the different type of queues may be included in a queue system. For example, one queue may be a first in first out queue, a second queue may be a last in first out queue, a third queue may be a queue ordered by address and a fourth queue may be a queue ordered by the contents of another field in the task register other than the next and previous fields associated with the task register.

An advantage of the present invention is that the queue system can be customized without requiring alteration to the hardware in the system.

Another advantage of the invention is that tasks can be transferred quickly from queue to queue without exposing task data to transfer errors.

BRIEF DESCRIPTION OF THE DRAWINGS

The invention will be described with respect to the particular embodiments thereof and reference will be made to the drawings, in which:

FIGS. 3A through 3L are diagrams illustrating the movement of tasks between the queues represented in FIG. 2 in accordance with the queue system.

FIG. 4 is a flow chart of routine A for removing a task register from a queue.

DESCRIPTION OF THE PREFERRED EMBODIMENTS

Figure 1:
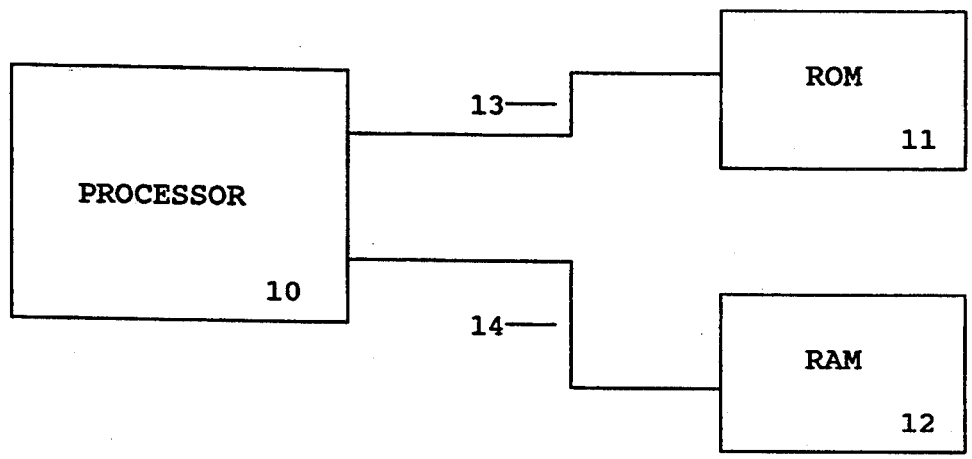
FIG. 1 is a high level drawing showing the processing system embodying the queue system of the invention.

Referring to FIG. 1, the queue system is embodied within a processing system comprised in part by processor 10, read only memory ROM 11 and random access memory RAM 12. Processor 10 communicates with ROM 11 via lines 13 and with RAM 12 via line 14. This general configuration of a processor, read only memory and random access memory, is widely used throughout the industry. The processing system is generally incorporated within a larger computing system and is dedicated to handling specific types of functions within the overall system. For instance, such processing systems are included within disk drive file control units, I/O channel control units, as well as within the main processing unit itself. The processor is running under the control of a system program which was written to enable the processor to perform its designed functions.

The queue system of this invention is controlled by processor 10 and uses RAM 12 for the actual formation of the pseudo queues. RAM 12 is structured to contain a plurality of storage addresses where each address includes a number of bits or bytes of data. The queue system requires that addresses within the random access memory be dedicated to the queue system for the formation of the pseudo queues within the RAM. Each of the addresses is considered to be a task register or a header register. Each header and task register includes at least two fields, a previous field and a next field. The previous field of a register stores the address of the preceding register in the queue and the next field stores the address of the following register in the queue.

Each queue is comprised of at least a header register. When a queue has no task registers associated with the queue, the header register for that queue will have the header registers own address stored in the previous and next field of the header register for the queue. Therefore the previous and next fields have pointers pointing to the location of the header register for the queue. Each task register is assigned to a queue at all times. In the queue system one queue is designated as the empty queue whose function it is to contain the task registers that are presently not assigned to a task that is to be operated upon by the operating system. The queue system may have many different configurations and can be tailored to the needs of the designer.

Figure 2:
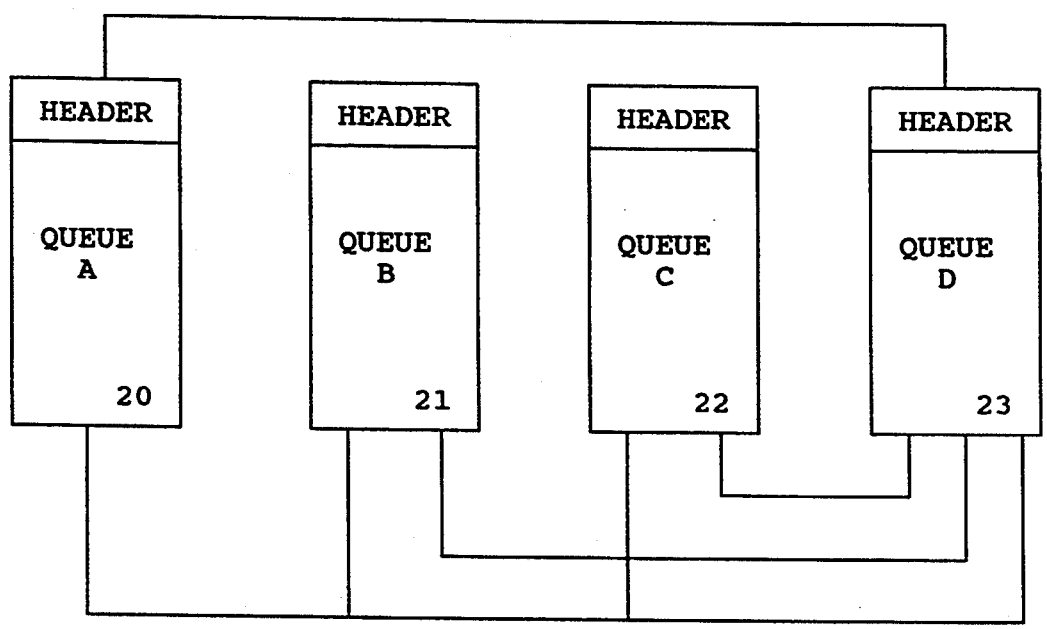
FIG. 2 is a representation of a queue system configuration employing four queues.

FIG. 2 is a configuration consisting of four queues, 20, 21, 22 and 23, within the queue system for the purpose of explaining the preferred embodiment of the queue system. The configuration is comprised of queue D 23 which acts as the empty queue and which initially will contain all the task registers in the queue system. When processor 10 receives a task to be performed by using the queue system, the task is assigned to the task register having the lowest address in queue D 23. The queue is then removed from queue D 23 and inserted into queue A 20. While the task is in queue A 20 the system will perform various operations to determine what the task is and what resources and operations must be performed with regard to that task by the processing system. The processing system then makes a decision as to whether the task is to be processed in accordance with a first processing course associated with queue B 21 or a second processing course associated with queue C 22. The task register is then effectively moved by removing the task register from queue A 20 and inserting the task register in either queue B 21 or queue C 22. When the task is completed the task register is removed from queue B 21 or queue C 22 and inserted into queue D 23. The system has the further option that if the task need not be processed by the processing course associated with queue B 21 or queue C 22, the task register associated with the then completed task is removed from queue A 20 and inserted into queue D 23.

Referenced copending patent application "System for Allocating Tasks Between Two Actuators Servicing the Same Magnetic Disk Drive in a Single Disk Drive", describes a dual actuator system servicing a single magnetic disk media. The queue system of this invention is employed within the microprocessor and RAM unit referred to therein. In Appendix A of this application and the cross-referenced application queue A 20 is the command queue, queue B 21 is the one channel queue where a task for retrieving or storing data onto the magnetic media will employ only one of the two actuators, queue C 22 is a two channel queue which uses both actuators in the performance of a command from the system with regard to the single magnetic media and, finally, queue D 23 is the empty queue.

The routines for inserted and removing a task into queue B 21, the one channel queue, is set forth in detail in the cross-referenced copending application and will not be repeated herein. For simplicity in describing the queue system of this invention queue B 21 will be designated as a queue which is address ordered. It should be understood that the queue system of the invention is not limited to the configuration shown in FIG. 2 and the designer of the queue system, in accordance with this invention, can have the queue system comprised of as many queues as the system designer wishes, where each of those queues can be ordered in accordance with the criteria set forth and controlled by the designer. Further, the addresses of the memory registers within the random access memory may be a single block of dedicated addresses or a plurality of blocks of dedicated addresses or addresses that are not consecutive. Again, which addresses and the distribution of those addresses within the random access memory is designer choice and the location of the addresses used in the memory is not critical to the queue system architecture.

In review, for simplicity in describing the invention, the task register in queues A 20, B 21 and D 23 are address ordered within the queue and the task registers in queue C 23 are ordered in the sequence of insertion into the queue. If the tasks in queue C 23 are serviced by using the task register address stored in the next field of the header register for queue C 23, then queue C 23 effectively becomes a first in first out (FIFO) queue. If the tasks in queue C 23 are serviced by using the task register address stored in the previous field of the header register for queue C 23, then queue C 23 effectively becomes a last in first out (LIFO) queue. It can readily be seen that the character of the queue is determined by the system designer as to how he orders the queues within the queue system and how he removes tasks from the queue. Once again the classification of each of the queues into a type of queue is not critical within the system except that one queue must be dedicated as an empty queue to ensure that all task registers associated and used in the queue system are always placed within one of the queues of the queue system.

Referring to FIG. 4, routine A is a procedure for removing a task register from any queue within the queue system. During a move operation for moving a task register from one queue to another queue, the move operation first executes routine A, the removal of the task register, hereinafter referred to as the current register, from the queue. To perform this removal operation routine A performs the following sequence of steps. Step 1 makes the address stored in the next field of the previous register, whose address is stored in the previous field of the current register, equal to the address stored in the next field of the current register. Step 2 makes the address stored in the previous field of the next register, whose address is stored in the next field of the current register, equal to the address stored in the previous field of the current register. In this manner the linkage between the task registers in the queue has been reestablished after the removal of the current register from the queue. It should be noted that no action at this time is taken with regard to the next field and previous field of the current register being removed as this will be addressed during the insertion routine of the removed current register into another queue.

Figure 5:
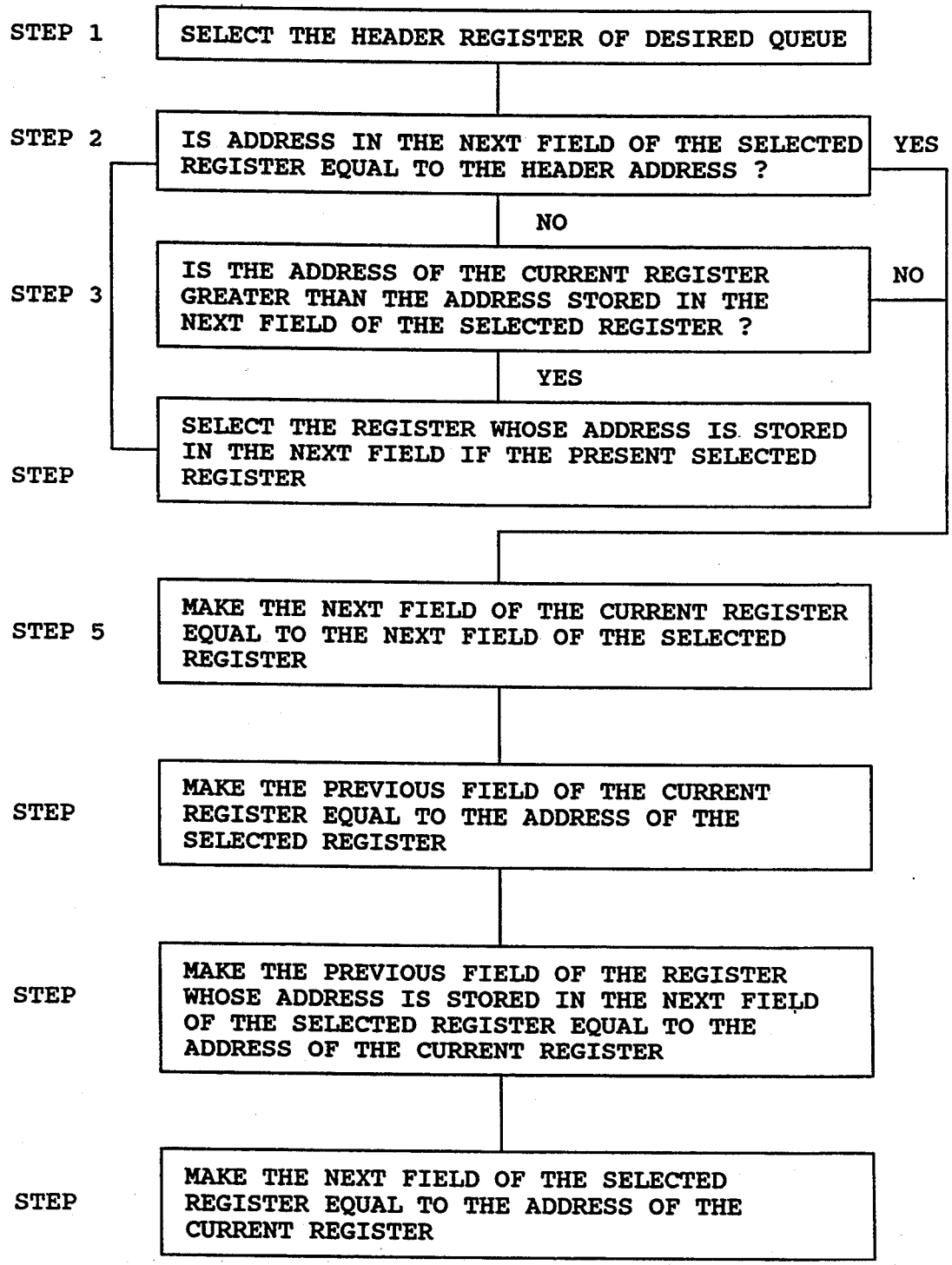
FIG. 5 is a flow chart of routine B for inserting a task register into a queue in an ordered sequence using the example of ordering by task register address.

Referring to FIG. 5, routine B is a process for the insertion of a removed current register into a queue in an ordered sequence using the example where the task registers are ordered in ascending order of the addresses of the task registers in the queue. This would be the routine followed when a removed current register is inserted into queues A, B or D of the configuration as heretofore described with regard to FIG. 2. In this operation it is required that the current register be inserted in the queue between the register having the next lowest address and the register having the next highest address than the address of the current register to be inserted in the queue. Attention must be paid to the circumstance that the header register may be one of the registers whose previous or next field will be changed by this procedure.

Routine B performs this operation by executing the following sequence of steps. Step 1 selects the header register of the desired queue into which the current register is to be inserted. Step 2 determines if the address stored in the next field of the selected register, which in the first instance will be the header register, is equal to the address of the header register. If the address stored in the next field of the selected register is the address of the header register, the routine will branch to step 5. If the address stored in the next field of the selected register is not equal to the address of the header register, step 3 is performed which tests if the address of the current register is greater than the address stored in the next field of the selected register. If this inquiry is negative, the routine branches to step 5. If the inquiry of step 3 is affirmative, step 4 is performed to make the selected register the register whose address is stored in the next field of the presently selected register and will return to step 2. The loop of step 2, step 3 and step 4 will be repeated until the loop is exited either from step 2 or step 3. When the routine exits from either step 2 or step 3, step 5 is processed. Step 5 makes the address stored in the next field of the removed current register to be equal to the address stored in the next field of the selected register. Step 6 then makes the address stored in the previous field of the removed current register equal to the address of the selected register. Step 7 then makes the address stored in the previous field of the register whose address is stored in the next field of the selected register equal to the address of the removed current register. Finally, step 8 makes the address stored in the next field of the selected register equal to the address of the removed current register. It should be noted that steps 5, 6, 7 and 8 may be interchanged except that step 8 must always follow the completions of presently step 5 and step 7. At the completion of step 8 of routine B, the removed current register will have been inserted in the queue and all task registers within the queue will be order in ascending address order of the task registers in the queue.

While Routine B has been described for the ordering of the task register in ascending task register address order, the ordering may be done by using data in an additional field in each header and task register in the queue system. When an additional field is used to determine the sequence of the task registers in the queue, Routine B would be modified in steps 1, 2, 3 and 4 to determine the appropriate selected register in accordance with the data stored in that additional field being used for that purpose. Once the selected register has been determined then the current task register to be inserted is inserted by step 5, 6, 7 and 8 of Routine B.

Figure 6:
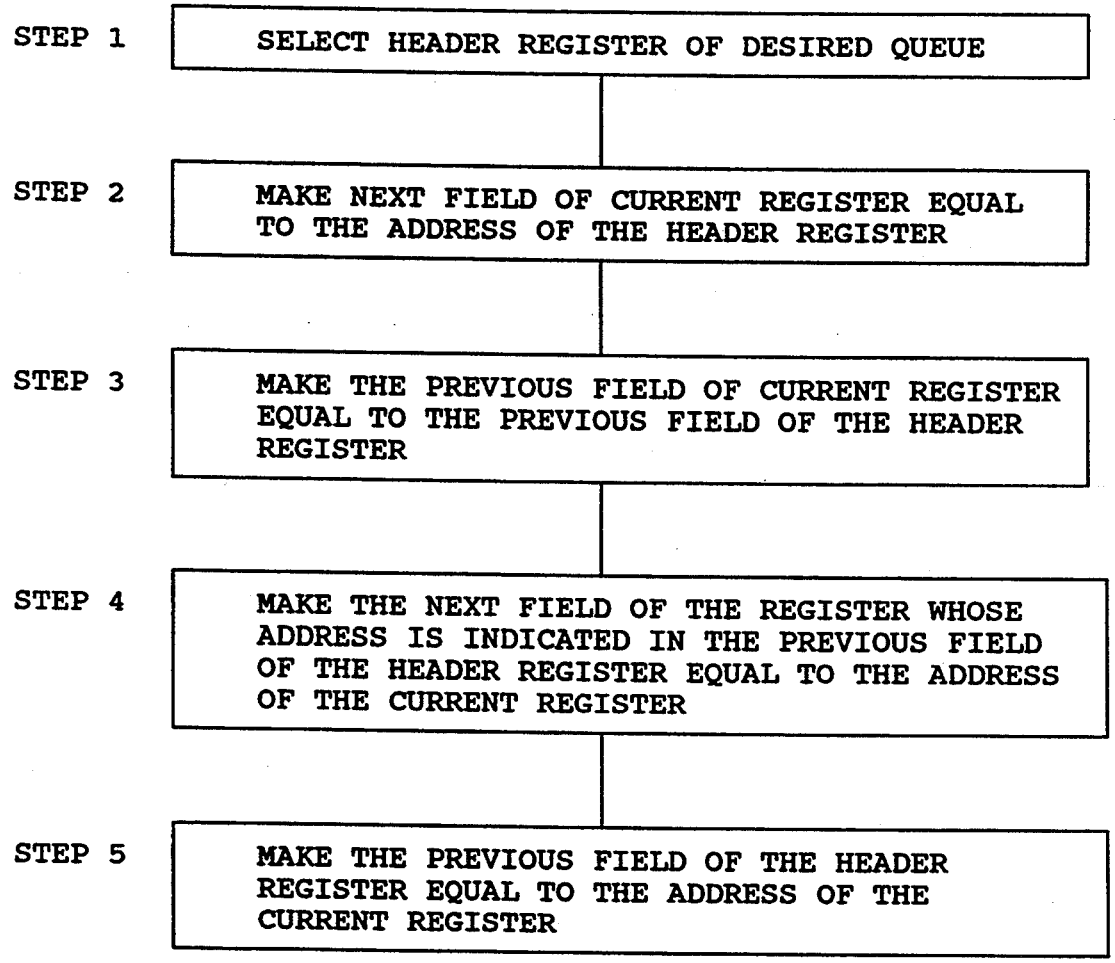
FIG. 6 is a flow chart of routine C for inserting a task register into a queue such that the task register will be in the last position of that queue.

Referring to FIG. 6, routine C is a procedure for the insertion of the removed current register into a queue where the removed current register will be inserted as the last task register in the queue. Effectively, the task registers are ordered within the queue in the sequence in which the task registers were inserted into the queue. Routine C performs this operation by executing the following sequence of steps. Step 1 selects the header register of the desired queue. In the queue configuration of FIG. 2, routine C would be performed whenever a removed current register is to be inserted into queue C 23. Step 2 then makes the address stored in the next field of the removed current register equal to the address of the header register. This will ensure that the removed current register will be inserted in the queue as the last register in the queue. Step 3 then makes the address stored in the previous field of the removed current register equal to the address stored in the previous field of the header register. Step 4 then makes the address stored in the next field of the register whose address is indicated in the previous field of the header register equal to the address of the removed current register. Finally, step 5 makes the address stored in the previous field of the header register equal to the address of the removed current register.

The registers in the queue are linked in a forward loop by the next fields in the registers and in a backward loop by the previous fields in the register. The use of the next field and previous field within each of the registers within each of the queues allows the system to proceed up and down a queue in an orderly fashion. The system may also access any register within the queue regardless of its position within the queue, according to the address of the register being sorted by the system. Again this allows maximum flexibility to the system designer who is designing the queue system to meet the needs of the system designer. If so desired, routines A, B and C may be permanently stored within the ROM 11 to be accessed by processor 10 whenever a move operation between queues is indicated by the operating system.

The operation of the queue system will be discussed with regard to the examples shown in FIGS. 3A through 3L.

LEGEND FOR FIG. 3

ADD Memory Address of Register
PF Field With Address of Previous Register in the Queue
NF Field With Address of Next Register in the Queue
TN Number of the Task Assigned to the Register
Q Queue to Which Register is Assigned The figures each show four header registers having addresses A, B, C and D respectively. Address A is the address of the header register for queue A 20, address B is the address of the header register for queue B 21, address C is the address of the header register for queue C 22, and address D is the address of the header register for queue D 23. Nine task registers are shown having addresses from 1 through 9. Again there is no significance to the addresses selected for use in these examples and the addresses may be selected for either the header registers or the task registers in accordance with the criteria specified and used by the system designer. Each of the header registers and task registers have a previous field PF and a next field NF associated with it. Once again the previous field PF will have the address of the previous register within the queue and the next field NF will have the address of the next register within the queue. With regard to the task registers two other columns are supplied, the column labeled TN is used to identify the task that is assigned to a task register and column labeled Q is used to indicate which of the queues a task register is presently assigned.

FIG. 3 shows the relationship of the task registers and header registers when all of the task registers are assigned to queue D 23. As can be seen, the header registers for queues A, B and C in addresses A, B and C have each of the address of their own associated header register stored in the previous fields and next fields of their associated register. When the previous field and next field both contain the address of the header register, that queue is empty. Therefore queues A, B and C are empty at this time and all registers are in the queue D 23. The next field of header register for queue D 23 contains the address of the first task register in the queue at address 1 and the previous field of the header register for queue D 23 contains the address of the last task register in the queue at address 9. Hereinafter the task register will be identified by the address of the task register, for example task register 1 is the task register located at address 1 in the RAM 13. In task register 1 the previous field contains address D, the address of the header register, and the next field contains address 2, the address of the following task register in queue D 23. In task register 9, the previous field contains address 8, the address of the preceding task register in the queue, and the next field contains address D, the address of the header register. By observation, task registers 2, 3, 4, 5, 6, 7 and 8 each have their previous field containing the address of the preceding task register in the queue and their next field containing the address of the following task register in the queue. The header register for queue D 23 and task registers 1 through 9 are therefore interlinked to form queue D 23.

Assume that the operating system upon receiving a task will store that task in the task register whose address is stored in the next field of empty queue and then will move that register from queue D 23 to queue A 20. Assume that the operating system receives task A1 for processing. To perform the above described operation, the operating system would first store task A1 in task register 1 and then would execute routine A to remove task register 1 from queue D 23. Task register 1 will be the current register referred to in routine A and B. Routine B would next be executed to insert task register 1 into queue A 20 by sequentially executing steps 1, 2, 5, 6, 7 and 8. The results of the procedure are shown in FIG. 3B where task register 1, containing task A1, is in queue A 20 and all other task registers remained in queue D 23. It should be noted that the next field in queue D 23 now points to task register 2 rather than to task register 1.

Referring to FIG. 3C, assume that the system next receives task A2 which will now be stored in task register 2 in queue D 23 which will then be moved to queue A 20. After task A2 has been loaded into task register 2, task register 2 will be removed from queue D by routine A. Routine B will next insert register 2 into queue A 20 by executing steps 1, 2, 3, 4, 2, 5, 6, 7 and 8. The results of the procedure are shown in FIG. 3C.

Referring to FIG. 3D, assume the system next receives task A3 which is stored in register 3 in queue D 23 and then register 3 is moved from queue D 23 to queue A 20. Routine A will be executed to remove register 3 from queue D 23. Then routine B will insert register 3 within queue A 20 by sequentially executing steps 1, 2, 3, 4, 2, 3, 4, 2, 5, 6, 7 and 8. The results of the procedure are shown in FIG. 3D.

In summary, at this time queue A 20 consists of header register A and task registers 1, 2 and 3, queue B 21 consists of header register B, queue C 22 consists of header register C, and queue D 23 consists of header register D and task registers 4, 5, 6, 7, 8 and 9.

Referring to FIG. 3E, assume that the system next determines that task A1 should be moved from queue A 20 to queue B 21 for further processing. Since task A1 is stored in task register 1, routine A is executed to remove task register 1 from queue A 20. Routine B is then executed to insert task register 1 into queue B 21 by executing sequentially steps 1, 2, 5, 6, 7 and 8.

Referring to FIG. 3F, assume the operating system next receives task A4 which is stored in task register 4 in queue D 23 which is then inserted into queue A 20. Routine A is executed to remove task register 4 from queue D 23. Routine B is executed to insert task register 4 into queue A 20 by executing sequentially steps 1, 2, 3, 4, 2, 3, 4, 2, 5, 6, 7 and 8. The results of this procedure are shown in FIG. 3F.

In summary, queue A 20 now contains header register A and task registers 2, 3 and 4, queue B 21 contains header register B and task register 1, queue C 22 contains header register C and queue D 23 consists of header register D and task registers 5, 6, 7, 8 and 9.

Referring to FIG. 3G, assume next that the operating system determines that task A3 should be moved from queue A 20 to queue C 22. Since task A3 is stored in task register 3, routine A will be executed to remove task register 3 from queue A 20. Routine C will then be executed to insert task register 3 into queue C 22 by sequentially executing steps 1, 2, 3, 4 and 5. The results of this procedure are shown in FIG. 3G.

Referring to FIG. 3H, next assume that tasks A5, A6 and A7 are received in that order by the system to be processed by the system. These tasks will be inserted in task registers 5, 6 and 7. Task registers 5, 6 and 7 will then be moved from queue D 23 to queue A 20. Each of these operations will include the operation of executing routine A and then routine B for each of these tasks. The results of these procedures are shown in FIG. 3H.

In summary, at this time queue A 20 consists of header register A and task registers 2, 4, 5, 6 and 7, queue B 21 consists of header register B and task register 1, queue C 22 consists of header register C and task register 3, and queue D 23 consists of header register D and task registers 8 and 9.

Referring to FIG. 3I, assume that the operating system determines that task A5 should be moved from queue A 20 to queue C 22. Since task A5 is in task register 5, routine A will be executed to remove task register 5 from queue A 20. Routine C will then be executed to insert task register 5 into queue C 22 by sequentially executing steps 1, 2, 3, 4 and 5. The results of this operation are shown in FIG. 3I.

Referring to FIG. 3J, next assume that the operating system determines that task A2 should be moved from queue A 20 to queue C 22 for processing. Since task A2 is located in task register 2, routine A is executed to remove task register 2 from queue A 20. Routine C is then executed to insert task register 5 into queue C 22 by sequentially executing steps 1, 2, 3, 4 and 5. The results of this procedure are shown in FIG. 3J.

In review, at this time queue A 20 consists of header register A and task registers 4, 6 and 7, queue B 21 consists of header register B and task register 1, queue C 22 consists of header register C and task registers 3, 5 and 2, and queue D 23 consists of header register D and task registers 8 and 9.

Referring to FIG. 3K, the system next having determined that task A1 has been completed will return task register A1, storing task A1, from queue A 20 to queue D 23. Routine A will be executed to remove task register 1 from queue A 20. Routine B will then be executed to insert task register into queue D 23 by sequentially executing steps 1, 2, 3, 5, 6, 7 and 8. The results of this procedure are shown in FIG. 3K.

Referring to FIG. 3L, assume that the operating system task 8 which is stored in task register 1 in queue D 23 which is then inserted into queue A 20. After task A8 is stored in task register 1, routine A is then executed to remove task register 1 from queue D 23. Routine B is then executed to insert task register 1 into queue A 20 by sequentially executing steps 1, 2, 3, 5, 6, 7 and 8. The results of this procedure are shown in FIG. 3L.

In summary, at this time queue A 20 contains header register A and task A8, A4, A6, A7 stored in task registers 1, 4, 6 and 7, respectively, queue B 21 consists of header register B, queue C 22 contains header register C and task A3, A5 and A2 stored in task registers 3, 5 and 2, respectively and queue D 23 consists of header register D and task registers 8 and 9.

The foregoing discussion has exemplified the operation of the queue system and how the queue system can be customized by the designer to meet the designer's needs. While the queue system has been described as using memory locations within a random access memory, it should be understood that dedicated hardware registers could be used instead of the random access memory.

It can readily be appreciated that the movement of the tasks between queues only necessitated the modifications of the previous and next fields of the registers being affected by the removal and insertion of a task register into a queue. At no time is it necessary to move the actual data associated with the task stored within the task register when the task register containing the task was effectively moved between queues. In the foregoing manner the queue system has allocated registers to form pseudo queues where each pseudo queue is comprised of a header register and one or more of the task registers and where each task register is always assigned to a queue in the queue system. The resulting queue system is one that is readily available to be customized by the designer and easy alteration and modification as the system requirements are changed.

The routine set forth in FIGS. 4, 5 and 6 are implemented in microcode using known digital software implementation and were assembled using Motorolla 68C11 Assembler, Series 5.0. The microprograms are detailed in Appendix A and carry out the function of the routines of the flow charts as shown in FIGS. 4, 5 ( not by task register ordering but by additional field ordering) and 6. It should be understood that the method can be embodied in other microprograms using other programmable languages or can be stored in the read only memory within a computer system. The functions of processor 10 can be implemented by a hardware state machine dedicated to perform the functions necessary to carry out the routines described herein.

While the invention has been particularly shown and described with reference to the preferred embodiments therefore, it will be understood by those skilled in the art that changes in form and detail may be made therein without departing from the spirit and scope of the invention. Given the above disclosure of general concepts and specific embodiments,, the scope of the protection sought is defined by the following claims.

APPENDIX A

© Conner Peripherals, Inc. 1992

```
;*********************************************************
; NAME: QTOEMPTY
;*********************************************************
; PURPOSE:     Move the CQE (Command Queue Entry) to the empty queue
;*********************************************************
; THEORY:
;                 Y points to the CQE to be moved.
;
;*********************************************************
; EXIT:
;                 NONE
;
;*********************************************************
; AUTHOR:   Steve Cornaby
; DATE: 8 Aug 1990
; HISTORY:
;*********************************************************
```

```
                              QTOEMPTY:
AA9A

AA9A    0F                        SEI                           ;Don't allow interrupts while we
                                                                ; are adjusting pointers
                                  ;remove this CQE from current queue
AA9B    CD EE 00                  LDX     <S_PRV,Y             ;point X to previous entry
AA9E    18 EC 02                  LDD     <S_NXT,Y             ; get next of removed entry
AAA1    ED 02                     STD     <S_NXT,X             ;  store in next of previous entry AAA3    CD EE 02                  LDX     <S_NXT,Y             ; point X to next entry
AAA6    18 EC 00                  LDD     <S_PRV,Y             ; get previous of removed queue
AAA9    ED 00                     STD     <S_PRV,X             ;  store in previous of next entry ;insert new CQE into empty queue
AAAB    CE 11 C8                  LDX     #V_EMPTY             ;Get queue header
AAAE    EE 00                     LDX     <S_PRV,X             ; point to last CQE in queue
AAB0    1A EF 02                  STY     <S_NXT,X             ; point next pointer to new CQE
AAB3    CD EF 00                  STX     <S_PRV,Y             ;  point prev pointer of new CQE to last entry AAB6    CE 11 C8                  LDX     #V_EMPTY             ;Get queue header
AAB9    1A EF 00                  STY     <S_PRV,X             ; point previous to new CQE
AABC    CD EF 02                  STX     <S_NXT,Y             ; point next of new CQE to header AABF    0E                        CLI                          ;Interrupts OKAY now AAC0    39                        RTS                          ;Return to post status and sense ;************************************************************
                              ; NAME: QTO2CHAN
                              ;************************************************************
                              ; PURPOSE:    Move the CQE (Command Queue Entry) to the 2channel queue
                              ;
                              ;************************************************************
                              ; THEORY:
                              ;                 Y points to the CQE to be moved
                              ;
                              ;************************************************************
                              ; EXIT:
                              ;              NONE
                              ;
                              ;************************************************************
                              ; AUTHOR:     Steve Cornaby
                              ; DATE: 8 Aug 1990
                              ; HISTORY:
                              ;************************************************************

AAC1                          QTO2CHAN:

AAC1    0F                        SEI                          ;Don't allow interrupts while we
                                                               ; are adjusting pointers
                                  ;remove this CQE from current queue AAC2    CD EE 00                  LDX     <S_PRV,Y             ;point X to previous entry
AAC5    18 EC 02                  LDD     <S_NXT,Y             ; get next of removed queue
AAC8    ED 02                     STD     <S_NXT,X             ;  store in next of previous entry AACA    CD EE 02                  LDX     <S_NXT,Y             ; point X to next entry
AACD    18 EC 00                  LDD     <S_PRV,Y             ; get previous of removed queue
AAD0    ED 00                     STD     <S_PRV,X             ;  store in previous of next entry ;insert new CQE into 1 channel queue
AAD2    CE 11 D4                  LDX     #V_2CHAN             ;Get queue header
AAD5    EE 00                     LDX     <S_PRV,X             ; point to last CQE in queue
AAD7    1A EF 02                  STY     <S_NXT,X             ; point next pointer to new CQE
AADA    CD EF 00                  STX     <S_PRV,Y             ;  point prev pointer of new CQE to last entry AADD    CE 11 D4                  LDX     #V_2CHAN             ;Get queue header
AAE0    1A EF 00                  STY     <S_PRV,X             ; point previous to new CQE
AAE3    CD EF 02                  STX     <S_NXT,Y             ; point next of new CQE to header AAE6    0E                        CLI                          ;Interrupts OKAY now AAE7    39                        RTS                          ;Return to post status and sense
```

```
;*********************************************************************
; NAME: QTOSTAT
;*********************************************************************
; PURPOSE:    Move the CQE (Command Queue Entry) to the status queue
;*********************************************************************
; THEORY:
;               Y points to the CQE to be moved.
;               Since it is possible for the host to be connected to the
;               process to give status, QTOSTAT checks for this condition
;               and places the queue at the head if the host is already
;               connected.
;*********************************************************************
; EXIT:
;               NONE
;*********************************************************************
; AUTHOR:     Steve Cornaby
; DATE: 8 Aug 1990
; HISTORY:
;*********************************************************************

QTOSTAT:
AAE8    0F                      SEI                             ;Don't allow interrupts while we
AAE9    1A 0E 20                BSET    H_PORTD,20h             ;*****TEST*****
                                                                ; are adjusting pointers
                                ;remove this CQE from current queue
AAEC    CD EE 00                LDX     <S_PRV,Y                ;point X to previous entry
AAEF    18 EC 02                LDD     <S_NXT,Y                ; get next of removed queue
AAF2    ED 02                   STD     <S_NXT,X                ;  store in next of previous entry AAF4    CD EE 02                LDX     <S_NXT,Y                ; point X to next entry
AAF7    18 EC 00                LDD     <S_PRV,Y                ; get previous of removed queue
AAFA    ED 00                   STD     <S_PRV,X                ;  store in previous of next entry AAFC    CE 11 D8                LDX     #V_STAT                 ;Get queue header AAFF    18 A6 23                LDAA    <S_CINITBIN,Y           ;See if we are currently connected
AB02    26 02                   BNE     QTOS05                  ; request at head, if not, at tail AB04    EE 00                   LDX     <S_PRV,X                ;point to last CQE in queue
AB06                    QTOS05:
AB06    1A EF 02                STY     <S_NXT,X                ; point next pointer to new CQE
AB09    CD EF 00                STX     <S_PRV,Y                ; point prev pointer of new CQE to last entry AB0C    CE 11 D8                LDX     #V_STAT                 ;Get queue header
AB0F    1A EF 00                STY     <S_PRV,X                ; point previous to new CQE
AB12    CD EF 02                STX     <S_NXT,Y                ; point next of new CQE to header
```

Attorney Docket No.: CONN8231MCF/GBR/EMS
EMS/CONN/8231.001                                                                  01/14/93 - 16:08

```
AB15    1D 08 20                BCLR    H_PORTD,20h             ;*****TEST*****

AB18    0E                      CLI                             ;Interrupts OKAY now AB19    39                      RTS                             ;Return to post status and sense
```

```
;*********************************************************************
; NAME: QTOCNTH
;*********************************************************************
; PURPOSE:    Point to the CQE with a the continue queue entry at head.
;*********************************************************************
; THEORY:
;               Y points to the CQE to be pointed to by the continue queue.
;               AccD points on entry to the continue address
;*********************************************************************
; EXIT:
;               NONE
;*********************************************************************
; AUTHOR:     Steve Cornaby
; DATE: 16 Aug 1990
; HISTORY:
;*********************************************************************

AB1A                    QTOCNTH:
AB1A                    QTOCNTT:

AB1A    0F                      SEI                             ;Make sure no interrupts occur
                                                                ; while CNTH or CNTT is being updated
AB1B    18 ED 09                STD     <S_EXCTADD,Y            ;Store off continue address
AB1E    18 A6 23                LDAA    <S_CINITBIN,Y           ;See if we are currently connected
AB21    27 09                   BEQ     QTOC15                  ; request at head, if not, at tail
AB23
                                ;place CQE pointer into continue queue at queue head
```

```
13473  A823  FE 11 DC            LDX    V_CNTH              ;Get queue pointed to by queue head
13474  A826  EE 00               LDX    <S_PRV,X            ; point to last CQE in queue
13475  A828  FF 11 DC            STX    V_CNTH              ;Adjust head to point to new entry
13476
13477  A82B  1A EF 04             STY    <S_CNTQPT,X         ; point to CQE that needs to continue
13478
13479  A82E  0E                   CLI                        ;Interrupts are Okay now
13480
13481  A82F  39                   RTS                        ;
13482  A830                QTOC15:
13483                             ;place CQE pointer into continue queue at queue tail
13484
13485  A830  FE 11 DE            LDX    V_CNTT              ;Get queue pointed to by queue tail
13486  A833  1A EF 04             STY    <S_CNTQPT,X         ; point to CQE that needs to continue
13487
13488  A836  EE 02                LDX    <S_NXT,X            ; point to next CQE in queue
13489  A838  FF 11 DE            STX    V_CNTT              ;Adjust tail to point to next unused
13490                                                         ;entry
13491
13492  A83B  0E                   CLI                        ;Interrupts are Okay now
13493
13494  A83C  39                   RTS                        ;
13495
13496
13497                     ;    NAME: QTO1CHAN
13498                     ;*************************************************
13499                     ;    PURPOSE:   Move the CQE (Command Queue Entry) to the 1channel queue
13500                     ;               If the command is dir... check if the chann
13501
13502                     ;*************************************************
13503                     ;    THEORY:
13504                     ;               Y points to the CQE to be moved.
13505                     ;               D contains execution address when execution continues.
13506
13507                     ;*************************************************
```

Attorney Docket No.: CONN8231MCF/GBR/EMS
EMS/CONN/8231.001
01/14/93 - 16:08

```
13508                     ;    EXIT:
13509                     ;               NONE
1
13512                     ;    AUTHOR:    Steve Cornaby
13513                     ;    DATE: 8 Aug 1990
13514                     ;    HISTORY:
13515                     ;*************************************************
13516
13517
13518  AB3D                QTO1CHAN:
13519
13520  AB3D  0F                   SEI                        ;Don't allow interrupts while we
13521                                                         ; are adjusting pointers
13522  AB3E  18 ED 09            STD    <S_EXCTADD,Y        ;Store continuing execution address
13523
13524                             ;remove this CQE from current queue
13525  AB41  CE EE 00             LDX    <S_PRV,Y            ;point X to previous entry
13526  AB44  1B EC 02             LDD    <S_NXT,Y            ; get next of removed queue
13527  AB47  ED 02                STD    <S_NXT,X            ; store in next of previous entry
13528
13529  AB49  CE EE 02             LDX    <S_NXT,Y            ; point X to next entry
13530  AB4C  1B EC 00             LDD    <S_PRV,Y            ; get previous of removed queue
13531  AB4F  ED 00                STD    <S_PRV,X            ; store in previous of next entry
13532
13533                             ;insert new CQE into 1 channel queue
13534  AB51  CE 11 D0             LDX    #V_1CHAN            ;Get queue header
13535  AB54  EE 00                LDX    <S_PRV,X            ; point to last CQE in queue
13536  AB56  1A EF 02             STY    <S_NXT,X            ; point next pointer to new CQE
13537  AB59  CF EF 00             STX    <S_PRV,Y            ; point prev pointer of new CQE to last entry
13538
13539  AB5C  CE 11 D0             LDX    #V_1CHAN            ;Get queue header
13540  AB5F  1A EF 00             STY    <S_PRV,X            ; point previous to new CQE
13541  AB62  CF EF 02             STX    <S_NXT,Y            ; point next of new CQE to header
13542
13543
13544  AB65  0E                   CLI                        ;Interrupts OKAY now
13545
13546  AB66  39                   RTS                        ;Return to post status and sense
```

```
13546                          ;************************************************************
13549                          ; NAME: QTOIORD
13550                          ;************************************************************
13551                          ; PURPOSE:    Move the CQE (Command Queue Entry) to the lchannel queue
13552                          ;             and order it.
13553
13554                          ;************************************************************
13555                          ; THEORY:
13556                          ;             Y points to the CQE to be moved.
13557                          ;             D contains execution address when execution continues.
13558                          ;             The lchannel queue is traversed and the destination address
13559                          ;             compared against that of the new command. When traversal
13560                          ;             is complete, X will be pointing to the CQE before which the
13561                          ;             current CQE is to be placed.
13562
13563                          ;************************************************************
13564                          ; EXIT:
13565                          ;             NONE
13566
13567                          ;************************************************************
13568                          ; AUTHOR:     Steve Cornaby
13569                          ; DATE: 8 Aug 1990
13570                          ; HISTORY:
13571                          ;************************************************************
13572
13573
13574   AB67                    QTOIORD:
13575
13576   AB67   0F                       SEI                           ;Don't allow interrupts while we
13577                                                                 ; are adjusting pointers
13578
13579                          ;** Set up continue address
13580
13581   AB68   18 ED 09                 STD     <S_EXCTADD,Y          ;Store continuing execution address
```

Attorney Docket No.: CONN8231MCF/GBR/EMS
EMS/CONN/8231.001                                                       01/14/93 - 16:08

```
13583                          ;** Remove this CQE from current queue
13584
13585   AB6B   CD EE 00                LDX     <S_PRV,Y              ;point X to previous entry
13586   AB6E   18 EC 02                LDD     <S_NXT,Y              ; get next of removed queue
13587   AB71   ED 02                   STD     <S_NXT,X              ; store in next of previous entry
13588
13589   AB73   CD EE 02                LDX     <S_NXT,Y              ; point X to next entry
13590   AB76   18 EC 00                LDD     <S_PRV,Y              ; get previous of removed queue
13591   AB79   ED 00                   STD     <S_PRV,X              ; store in previous of next entry
13592
13593   AB7B   0E                      CLI                           ;Allow interrupts now
13594
13595                          ;** Check to see if lchan queue empty
13596
13597   AB7C   CE 11 D0                LDX     #V_1CHAN              ;Get lchannel queue pointer
13598   AB7F   EE 02                   LDX     <S_NXT,X              ;Point to first entry
13599   AB81   8C 11 D0                CPX     #V_1CHAN              ; end if queue empty
13600   AB84   26 04                   BNE     ORD05                 ;Branch if not empty
13601   AB86   86 01                   LDAA    #01                   ;Set non-sequential flag
13602   AB88   20 6A                   BRA     ORD100
13603
13604   AB8A            ORD05:
13605                          ;** Command with which we are comparing may be directed. If so,
13606                          ;   it doesn't count for the compare. Continue with the next
13607                          ;   CQE.
13608
13609   AB8A   1E 08 40 5F             BRSET   <S_QSTAT,X,SB_DRCTD,ORD10 ;Branch if directed command
13610   AB8E
13611   AB8E            ORD10:
13612                          ;** Command not directed.
13613                          ;** Compare destination cylinder of new CQE against destination
13614                          ;   cylinder of lchan CQE. Branch to insert if new less than lchan.
13615   AB8E
13616   AB8E   EC 1B                   LDD     <S_DCYL,X             ;Get destination of lchan CQE
13617   AB90   C0 A3 18                CPD     <S_DCYL,Y             ; subtract destination cylinder new CQE
13618   AB93   23 04                   BLS     ORD15                 ; branch if NEW command fits before
13619                                                                ;   or is on same cylinder as 1CHAN command
13620   AB95   86 01                   LDAA    #01                   ;Set non-sequential command
13621   AB97   20 55                   BRA     ORD100
13622
13623                          ;** New command is greater than lchan CQE command. Check to see if
13624                          ;   it lchannel command is linked to the next command.
13625   AB99            ORD15:
13626   AB99   1F CC 01 0B             BRCLR   <S_CSTAT,X,SB_CLNKED,ORD20 ;Branch if command not linked
13627   AB9D   EE 02                   LDX     <S_NXT,X              ;Get next command to check it out
13628   AB9F   8C 11 D0                CPX     #V_1CHAN              ;Check if at end
13629   ABA2   26 F5                   BNE     ORD15                 ; branch if not
13630
13631   ABA4   86 01                   LDAA    #01                   ;AccA != 0 means non-sequential
13632   ABA6   20 4C                   BRA     ORD100                ; Insert at end if we are
13633
13634   ABA8            ORD20:
13635                          ;** Check if command can be coalesced. First priority is to check
13636                          ;   if it is the same type of command
13637
```

```
13638  ABA8  A6 10              LDAA   <S_CMD0,X              ;Get op code
13639  ABAA  19 A1 10           CMPA   <S_CMD0,Y              ; check if matches candidate CQE
13640  ABAD  26 35              BNE            ORD50          ; different op codes
13641
13642                                  ;** Command not linked.  Check if it is sequential to old command
13643
13644  ABAF  EC 20              LDD    <S_NXTLBA+1,X          ;Get 1st LBA past old command
13645  ABB1  10 A3 14           CPD    <S_CMD4,Y              ; compare against first LBA of new command
13646  ABB4  26 27              BNE           ORD50           ;Branch if not sequential
13647  ABB6  A6 1F              LDAA   <S_NXTLBA,X            ; High byte
13648  ABB8  19 A1 13           CMPA   <S_CMD3,Y              ; !
13649  ABBB  26 20              BNE           ORD50           ;Branch if not sequential
13650
13651                                  ;** Command was sequential.  Check if command is still active.
13652                                  ;   If so, link it to the following command.
13653
13654  ABBD  0F                 SEI                           ;Disable interrupts until lchan
13655                                                         ; queue is updated
13656
13657  ABBE  86 01              LDAA   #01                    ;Use AccA as a flag Attorney Docket No.: CONN8231MCF/GBR/EMS
                EMS/CONN/8231.001                                              01/14/93 - 16:08

13658  ABC0
13659  ABC0  E6 32              LDAB   <S_DSKSTAT,X           ;Get disk status
13660  ABC2  26 25              BNE           ORD35           ; Not executing if status already posted
13661
13662
13663  ABC4  1C 0C 01           BSET   <S_CSTAT,X,SB_CLNKED   ;Set linked bit in old CQE
13664  ABC7  18 1C 0C 02        BSET   <S_CSTAT,Y,SB_BLNKED   ; and backward linked bit in new CQE
13665
13666                                  ;** Check to see if command we are linking to is currently active
13667  ABCB  1F 0C 04 1A        BRCLR  <S_CSTAT,X,SB_CDATIN,ORD35 ; Not executing if data not in buffer
13668
13669  ABCF  1E 08 80 0C        BRSET  <S_QSTAT,X,SB_BCHAN,ORD30  ;Branch if executing on channel B
13670
13671                                  ;** Setup linked CQE with same attributes as currently executing CQE
13672
13673                                  ;Set attributes for channel A
13674  ABD3  18 1D 08 80        BCLR   <S_QSTAT,Y,SB_BCHAN    ; Not B channel
13675
13676  ABD7  CC 00 00           LDD    #0                     ;Get channel A offset
13677  ABDA  18 ED 2E           STD    <S_CHANOFF,Y           ; store in CQE channel offset
13678
13679  ABDD  20 0A              BRA           ORD35           ; continue
13680  ABDF                ORD30:
13681                                  ;Set attributes for channel B
13682  ABDF  18 1C 08 80        BSET   <S_QSTAT,Y,SB_BCHAN    ; Not B channel
13683
13684  ABE3  CC 00 20           LDD    #0020h                 ;Get channel B offset
13685  ABE6  18 ED 2E           STD    <S_CHANOFF,Y           ; store in CQE channel offset
13686  ABE9                ORD35:
13687  ABE9  EE 02              LDX    <S_NXT,X               ;Point to following CQE so new CQE
13688                                                         ; will be inserted after old CQE
13689  ABEB  20 07              BRA           ORD100          ; Branch to insert CQE
13690
13691                                  ;** new CQE is greater than or equal to lchan CQE. Move to the next
13692                                  ;   lchan CQE and try again.
13693  ABED                ORD50:
13694  ABED  EE 02              LDX    <S_NXT,X               ;Point to next entry
13695  ABEF  8C 11 D0           CPX    #V_LCHAN               ; insert before end of lchan queue
13696  ABF2  26 9A              BNE           ORD10           ;  if pointing to last entry
13697                                                         ;  else branch for another compare
13698  ABF4                ORD100:
13699                                  ;** Insert new CQE before lchannel CQE destination.
13700
13701
13702                                  ;insert new CQE into l channel queue
13703  ABF4  3C                 PSHX                          ;Preserve CQE before which we will
13704                                                         ; insert new CQE
13705
13706  ABF5  EE 00              LDX    <S_PRV,X               ; point to last CQE in queue
13707  ABF7  18 EF 02           STY    <S_NXT,X               ; point next pointer to new CQE
13708  ABFA  1F EF 00           STX    <S_PRV,Y               ; point prev pointer of new CQE to last entry
13709
13710  ABFD  38                 PULX                          ;Point at CQE
13711  ABFE  1F EF 00           STY    <S_PRV,X               ; point previous to new CQE
13712  AC01  1F EF 02           STX    <S_NXT,Y               ; point next of new CQE to header
13713
13714  AC04  0E                 CLI                           ;Allow interrupts
13715
13716  AC05  4D                 TSTA                          ;Set zero flag
13717  AC06  39                 RTS                           ;Return to post status and sense
13718
13719
13720       ;*****************************************************************
13721       ; NAME: CCHAN
13722       ;*****************************************************************
13723       ; PURPOSE:  Check if there are more entries in the lchannel queue.
13724       ;           Since channel commands can be directed, check the status
13725       ;           byte to see which chan we are currently servicing, and
13726       ;           check for other directed commands to that channel.  If
13727       ;           there are no directed commands for the channel, select
13728       ;           the first CQE in the lchannel queue and place it in the
13729       ;           appropriate channel header.  Then, clear the executing
13730       ;           bit such that the kernal will start the new process.
13731
13732       ;*****************************************************************
```

```
13733                                   ; THEORY:
13734                                   ;          Y points to the currently executing CQE.
13735                                   ;
13736                                   ;          The lchannel queue is checked to see if it is empty.  If
13737                                   ;          it is empty, then the address field of the currently
13738                                   ;          executing channel is set to zero.  If the lchannel queue
13739                                   ;          is not empty, but there are no CQEs directed to the
13740                                   ;          currently executing CQE, and no non-directed CQEs, the
13741                                   ;          address field of the currently executing channel is again
13742                                   ;          set to zero.
13743                                   ;
13744                                   ;          The routine will search all lchannel entries for directed
13745                                   ;          commands, which are executed first.  This occurs because
13746                                   ;          directed commands can be steps in the error recovery
13747                                   ;          sequence, and the command may be partially complete.  In
13748                                   ;          addition, read and write buffer commands are directed
13749                                   ;          commands.
13750                                   ;
13751                                   ;          This routine is also the location of more complex algorithims
13752                                   ;          for CQE selection.  Since they are as yet undefined, the
13753                                   ;          routine simply selects the first entry.
13754                                   ;
13755                                   ;          *****NOTE!*****
13756                                   ;          This routine can be called only after the current operation
13757                                   ;          has been removed from the lchannel queue by calling QTOSTAT,
13758                                   ;          etc.
13759                                   ;
13760                                   ;**********************************************************************
13761                                   ; EXIT:
13762                                   ;          NONE
13763                                   ;
13764                                   ;**********************************************************************
13765                                   ; AUTHOR:   Steve Cornaby
13766                                   ; DATE: 8 Sep 1990
13767                                   ; HISTORY:
13768                                   ;**********************************************************************
13769
13770   AC07                            CCHAN:
13771                                   ;** Since we will be looking for directed commands, the
13772                                   ;   routine splits to a checker for chanA and chanB.
13773            [01]                   .if TWOACT
13774   AC07     15 1E 08 80 33              BRSET    <S_QSTAT,Y,SB_BCHAN,CCH15 ;Branch if channel B is ending
13775            [00]                   .endif
13776   AC0C     CD EE 02                    LDX      <S_NXT,Y         ;Point to CQE after current CQE
13777   AC0F     20 02                       BRA      CCH02
13778   AC11                            CCH00:
13779                                   ;** ChanA is ending.  Get next CQE, (if any)
13780
13781   AC11     EE 02                       LDX      <S_NXT,X         ;Point to next CQE
13782   AC13                            CCH02:
13783   AC13     8C 11 D0                    CPX      #V_1CHAN         ; make sure it isn't header
13784   AC16     26 02                       BNE      CCH05            ;   branch to end if it isn't
13785
13786                                   ;** We are pointing to header.  We must skip the header and
13787                                   ;   point to the next CQE.  We are done when we are pointing
13788                                   ;   to the CQE currently pointed to by ACHAN.
13789
13790   AC18     EE 02                       LDX      <S_NXT,X         ;Skip header and point to next CQE
13791   AC1A                            CCH05:
13792                                        BSET     H_PORTD,10h      ;*****TEST*****
13793
13794   AC1A     BC 11 61                    CPX      V_ACHAN          ; check if we are done
13795   AC1D     26 05                       BNE      CCH10            ; Branch if we are not
13796   AC1F     CE 00 00                    LDX      #0000h           ; There are no other commands pending
13797   AC22     20 16                       BRA      CCH18            ; so clear channel and end
13798   AC24                            CCH10:
13799                                   ;** We are pointing to next valid CQE.
13800                                   ;** Make sure it is not already being executed on a channel
13801   AC24     1E 08 02 E9                 BRSET    <S_QSTAT,X,SB_CHANLNK,CCH00 ; branch if already linked
13802   AC28     1E 0C 02 E5                 BRSET    <S_CSTAT,X,SB_BLNKED,CCH00  ; or if backward coalesced
13803
13804   AC2C     1F 08 40 04                 BRCLR    <S_QSTAT,X,SB_DRCTD,CCH15 ;Branch if not a directed command
13805   AC30     1E 08 20 D0                 BRSET    <S_QSTAT,X,SB_DIRB,CCH00  ;Branch if directed to other channel
13806                                   ;** Command directed to this channel.  Point to it and end.
13807   AC34                            CCH15:

13808   AC34     1D 08 80                    BCLR     <S_QSTAT,X,SB_BCHAN    ;Clear channel b bit
13809   AC37     1C 08 02                    BSET     <S_QSTAT,X,SB_CHANLNK  ; and set channel linked bit
13810   AC3A                            CCH18:
13811   AC3A     FF 11 61                    STX      V_ACHAN                ;Update ACHAN
13812
13813                                        BCLR     H_PORTD,10h            ;*****TEST*****
13814
13815   AC3D     20 2E                       BRA      CCH100
13816
13817
13818
13819                                   ;** We are finishing an operation on B channel.  Point to CQE
13820                                   ;   immediately after current CQE.
```

```
13821
13822           [01]                          .if TWOACT
13823   AC3F                          CCH19:
13824
13825   AC3F   CD EE 02                       LDX     <S_NXT,Y           ;Point to next CQE
13826   AC42   20 02                          BRA             CCH22     :
13827   AC44                          CCH20:
13828                                         ;** ChanA is ending.  Get next CQE. (if any)
13829
13830   AC44   EE 02                          LDX     <S_NXT,X           ;Point to next CQE
13831   AC46                          CCH22:
13832   AC46   8C 11 D0                       CPX     #V_1CHAN           ; make sure it isn't header
13833   AC49   26 02                          BNE             CCH25      ;  branch to end if it isn't
13834
13835                                         ;** We are pointing to header. We must skip the header and
13836                                         ;   point to the next CQE. We are done when we are pointing
13837                                         ;   to the CQE currently pointed to by BCHAN.
13838
13839   AC4B   EE 02                          LDX     <S_NXT,X           ;Skip header and point to next CQE
13840   AC4D                          CCH25:
13841   AC4D   BC 11 63                       CPX     V_BCHAN            ; check if we are done
13842   AC50   26 05                          BNE             CCH30      ; Branch if we are not
13843   AC52   CE 00 00                       LDX     #0000h             ; There are no other commands pending
13844   AC55   20 13                          BRA             CCH33      ; so clear channel and end
13845   AC57                          CCH30:
13846                                         ;** We are pointing to next valid CQE
13847                                         ;** Make sure it is not already being executed on a channel
13848   AC57   1E 0B 02 E9                    BRSET   <S_QSTAT,X,SB_CHANLNK,CCH20 ; branch if already linked
13849   AC5B   1E CC 02 E5                    BRSET   <S_CSTAT,X,SB_BLNKED,CCH20  ; or if backward coalesced
13850
13851   AC5F   1F 0B 40 04                    BRCLR   <S_QSTAT,X,SB_DRCTD,CCH35  ;Branch if not a directed command
13852   AC63   1F 0B 20 DD                    BRCLR   <S_QSTAT,X,SB_DIRB,CCH20   ;Branch if directed to other channel
13853                                         ;** Command directed to this channel.  Point to it and end.
13854   AC67                          CCH35:
13855   AC67   1C 0B 32                       BSET    <S_QSTAT,X,SB_BCHAN+SB_CHANLNK  ; Set channel and channel linked bits
13856   AC6A                          CCH38:
13857   AC6A   FF 11 63                       STX     V_BCHAN            ;Update BCHAN
13858                                         .endif
13859
13860
13861   AC6D                          CCH100:
13862   AC6D   0F                             SEI                        ;Turn off interrupts until done
13863
13864                                         ;** Clear out all entries from CNT queue that match the CQE just
13865                                         ;   completed
13866                                         ;   AccY points to CQE we are just finishing
13867   AC6E
13868   AC6E   FE 11 0C                       LDX     V_CNTH             ;See what head is pointing at
13869   AC71   CC 00 00                       LDD     #0h                ;Initialize AccD to zero
13870   AC74   EE 00                          LDX     <S_PRV,X           ;Point back one entry on initialization
13871   AC76
13872   AC76                          CCH115:
13873   AC76   EE 02                          LDX     <S_NXT,X           ;Look at valid entry
13874   AC78   BC 11 DE                       CPX     V_CNTT             ; check if at tail
13875   AC7B   27 09                          BEQ             CCH120     ; branch to end if checked all entries
13876
13877   AC7D   1A A0 04                       CPY     <S_CNTQPT,X        ; Check if CQE matches that just written
13878   AC80   26 F4                          BNE             CCH115     ; branch if no match
13879   AC82   ED 04                          STD     <S_CNTQPT,X        ; Load with zeroes if matches to invalidate
13880   AC84   20 F0                          BRA             CCH115     ; Loop to look again
13881   AC86                          CCH120:
13882   AC86   0E                             CLI                        ;Allow interrupts again
```

Attorney Docket No.: CONN8231MCF/GBR/EMS
EMS/CONN/8231.001                                                        01/14/93 - 16:08

```
13883
13884   AC87   39                             RTS                        ; and return
13885
13886   ;*********************************************************************
13887   ; NAME: SCHAN
13888   ;*********************************************************************
13889   ; PURPOSE:    A non-directed command has just been placed in the 1channel
13890   ;             queue. The current status of the channels is unknown. Scan
13891   ;             the channels to see if they are currently busy. If either is
13892   ;             not busy, copy the CQE pointer into the channel command
13893   ;             register. The kernal will detect an un-started command
13894   ;             and start the channel command.
13895
13896   ;*********************************************************************
13897   ; THEORY:
13898   ;             Y points to the CQE just moved to the 1channel queue.
13899
13900   ;             Channel A is checked to see if it is empty. The channel
13901   ;             pointer will be zero if it is empty. If it is not empty,
13902   ;             Channel B is checked. If either channel is empty, the
13903   ;             contents of Y will be written to it. The channel in
13904   ;             process is 0 as it is a new command. The kernal samples
13905   ;             for a channel pointer != 0 and a Channel in process = 0
13906   ;             to know if it should begin a new command.
13907
13908   ;*********************************************************************
13909   ; EXIT:
13910   ;             NONE
13911
13912   ;*********************************************************************
13913   ; AUTHOR:     Steve Cornaby
13914   ; DATE: 11 Sep 1990
13915   ; HISTORY:
13916   ;*********************************************************************
```

```
13917
13918   AC83                    SCHAN:
13919   AC83    0F                      SEI                                 ;No interrupts while we mess with queue
13920
13921           [::]            .if TWOACT
13922
13923   AC89    FE 11 61                LDX     V_ACHAN                     ;Check if channel A free
13924   AC8C    26 0A                   BNE             SC05                ; branch if not
13925   AC8E    1B FF 11 61             STY     V_ACHAN                     ;Channel is free, tell kernal to start
13926   AC92    1B 1C 0B 02             BSET    <S_QSTAT,Y,SB_CHANLNK       ; CQE is now linked to a Channel
13927   AC96    20 0D                   BRA             SCEND               ; branch to continue
13928   AC98                    SC05:
13929   AC98    FE 11 63                LDX     V_BCHAN                     ;Check if channel A free
13930   AC9B    26 03                   BNE             SCEND               ; branch if not
13931   AC9D    1B FF 11 63             STY     V_BCHAN                     ;Channel is free, tell kernal to start
13932   ACA1    1B 1C 0B 02             BSET    <S_QSTAT,Y,SB_CHANLNK       ; CQE is now linked to a Channel
13933           [::]            .else
13934                                   LDX     V_ACHAN                     ;Check if channel A free
13935                                   BNE             SCEND               ; branch if not
13936                                   STY     V_ACHAN                     ;Channel is free, tell kernal to start
13937                                   BSET    <S_QSTAT,Y,SB_CHANLNK       ; CQE is now linked to a Channel
13938
13939           [::]            .endif
13940   ACA5                    SCEND
13941
13942   ACA5    0E                      CLI                                 ;Interrupts are okay now
13943
13944   ACA6    39                      RTS
13945
13946
13947        ;************************************************************
13948        ; NAME: FREEZQ
13949        ;************************************************************
13950        ; PURPOSE:
13951        ;               An error condition occurred in the process. Freeze the Q
13952        ;               so that no further operations will occur on the channel
13953        ;               until the host has a chance to do a command. Normally, the
13954        ;               command would be a request sense command, but if the host
13955        ;               instead chooses to do another command, Queue processing will
13956        ;               proceed normally.
13957

Attorney Docket No.: CONN8231MCF/GBR/EMS
            EMS/CONN/8231.001                                                   01/14/93 - 16:08

13958        ;************************************************************
13959        ; THEORY:
13960        ;               Y points to the currently executing CQE.
13961        ;
13962        ;               The routine will place the Queue in the state that it would
13963        ;               normally be if the queue were waiting for a command  It
13964        ;               requires a call to SCHAN to re-activate the channel. Such
13965        ;               a call occurs on any command, including request sense.
13966        ;               Thus, the channel is reactivated at the conclusion of the
13967        ;               following command.
13968
13969        ;************************************************************
13970        ; EXIT:
13971        ;               NONE
13972
13973        ;************************************************************
13974        ; AUTHOR:    Steve Cornaby
13975        ; DATE: 28 Dec 1990
13976        ; HISTORY:
13977        ;************************************************************
13978
13979   ACA7                    FREEZQ:
13980   ACA7    0F                      SEI                                 ;Turn off interrupts until done
13981
13982   ACA8    CC 00 00                LDD     #0                          ;Initialize AccD with zeros
13983
13984   ACAB    1D 1D 0B 10             BCLR    <S_QSTAT,Y,SB_CHANIP        ;No longer executing on this channel
13985
13986   ACAF    1E 1E 0B 80 05          BRSET   <S_QSTAT,Y,SB_BCHAN,FRZ10   ;Branch if channel B is ending
13987
13988   ACB4    FD 11 61                STD     V_ACHAN                     ;Put A channel to sleep
13989   ACB7    20 03                   BRA             FRZ20               ; and end
13990   ACB9                    FRZ10:
13991   ACB9    FD 11 63                STD     V_BCHAN                     ;Put B channel to sleep
13992                                                                       ; and end
13993
13994   ACBC                    FRZ20:
13995   ACBC    0E                      CLI                                 ;Allow interrupts again
13996
13997
13998   ACBD    39                      RTS                                 ; and return
13999
14000   ACBE                            END
14001
14002   ACBE                            INCLUDE S5DEFECT.ASM                ;Rd defect list / reassign / format
14003                                   STTL    S5DEFECT.ASM - Defect handling/reassign/format unit
14004                                   PAGE
```

Attorney Docket No.: CONN8231MCF/GBR/EMS
EMS/CONN/8231.001                                                       01/14/93 - 16:08

What is claimed is:

1. A queue system comprising:

a plurality of queues where each queue of said plurality of queues has a header register having a unique header register address and said header register containing a previous field and a next field where said previous field and said next field stores either said header register address of said header register or a task register address;

a plurality of task registers, each said task register having a Unique said task register address and contains a previous field and a next field where each said previous field and said next field stores either said header register address for one of said queues in said plurality of said queues or said task register address for another one of said task registers of said plurality of task registers; and control means for dynamically assigning and transferring and maintaining each said task registers by controlling the addresses stored in said previous field and next field in each of said header registers and each of task registers such that each of said task registers is always in one of said plurality of queues and for effectively moving said task registers between queues without physically moving said task registers, wherein said control means orders said task registers in queue of said plurality of queues by storing in said previous field of each of said task registers in said queue the task register address of the task register having the next lower task register address of said task registers in said queue or said header register address for said queue if no other task register in said queue has a lower said task register address and for storing in said next field of each of said task registers in said queue the task register address of the task register having the next highest task register address of said task registers in said queue or said header register address for said queue if no other task register in said queue has a higher said task register address and by storing in the next field of header register for said queue the task register address of said task register in said queue having the lowest task register address and for storing in the previous field of said header register for said queue the task register address of said task register in said queue having the highest task register address in said queue.

2. The queue system of claim 1 wherein said control means will store said header register address for said header register in said next field and said previous field of said header register when said queue of said plurality of queue having said header register has no said task registers assigned to said queue by said control means.

3. The queue system of claim 1 wherein said control means further comprises:

a deletion means for removing one of said task registers from one of said queues of said plurality of queues; and an insertion means for inserting said one of said task registers removed from said queue by said deletion means into another one of said plurality of queues.

4. The queue system of claim 3 wherein said insertion means includes a first means for inserting said task register in said queue as the last task register in said queue.

5. The queue system of claim 3 wherein said insertion means includes a second means for inserting said task register in said queue as a function of the address of said task register being inserted into said queue.

6. The queue system of claim 3 wherein said control means effectively moves a task register between a first queue and a second queue within said queue system by first actuating said deletion means to remove said task register from said first queue and then actuating said first or second means of said insertion means for inserting said removed task register into said second queue.

7. The queue system of claim 1 wherein one of said queues in said queue system is an empty queue and contains those task registers which are not placed in another queue within said queue system thereby insuring that, at all times, each task register will be placed in a queue in said queue system.

* * * * *

UNITED STATES PATENT AND TRADEMARK OFFICE
CERTIFICATE OF CORRECTION

PATENT NO. : 5,410,722
DATED : April 25, 1995
INVENTOR(S) : Stephen R. Cornaby

It is certified that error appears in the above-indentified patent and that said Letters Patent is hereby corrected as shown below:

Column 2, line 26, "contains" should be --contain--.
Column 4, line 39, "inserted" should be --inserting--.

Column 11 and 12 between lines 13357 and 13358; Column 13 and 14 between lines 13432 and 13433; Column 15 and 16 between lines 13507 and 13508; Column 17 and 18 between lines 13582 and 13583; Column 19 and 20 between lines 13657 and 13658; Column 21 and 22, lines 1 and 2; Column 21 and 22 between lines 13807 and 13808; Column 23 and 24 between lines 13882 and 13883; Column 25 and 26 between lines 13957 and 13958; Column 25 and 26 below line 14004, delete:
 "Attorney Docket No.:  CONN8231MCF/GBR/EMS
 EMS/CONN/8231.001                                     01/14/93 - 16:08"

Column 27, line 11, "Unique" should be --unique--.
Column 28, line 10, "queue" should be --queues--.

Signed and Sealed this

Ninth Day of September, 1997

Attest:

BRUCE LEHMAN

Attesting Officer

Commissioner of Patents and Trademarks